(12) United States Patent
Sekiguchi et al.

(10) Patent No.: US 6,521,301 B1
(45) Date of Patent: Feb. 18, 2003

(54) DISCHARGE SURFACE PROCESSING METHOD

(75) Inventors: Hisayoshi Sekiguchi, Tokyo (JP); Akihiro Goto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/869,935
(22) PCT Filed: Nov. 8, 1999
(86) PCT No.: PCT/JP99/06195
§ 371 (c)(1), (2), (4) Date: Jul. 9, 2001
(87) PCT Pub. No.: WO01/34333
PCT Pub. Date: May 17, 2001

(51) Int. Cl.⁷ .................................. H05H 1/32
(52) U.S. Cl. ................. 427/540; 427/430.1; 427/346; 427/580
(58) Field of Search ................ 427/540, 580, 427/430.1, 346

(56) References Cited

FOREIGN PATENT DOCUMENTS

| JP | 9-192937 | 7/1997 | ............ B23H/9/00 |
| JP | 10-130318 | 5/1998 | ............ B22F/3/10 |
| JP | 10-337617 | 12/1998 | ............ B23H/9/00 |
| JP | 11-226820 | 8/1999 | ............ B23H/9/00 |

OTHER PUBLICATIONS

International Search Report, Nov. 8, 1999.
VDI Berichte 1405, Preceeding of ISEM, A. Goto, et al, p. 271–278, 1998 (No month avaible).

*Primary Examiner*—Bernard Pianalto
(74) *Attorney, Agent, or Firm*—Sughrue Mion, PLLC

(57) ABSTRACT

A Z axis driving device (21) is controlled to be driven by a control device (23), and the processing power is supplied between the electrodes of a discharge surface processing electrode (14) and a punch (1). Thus, electric discharge is occurred between the end surface (4) of the punch (1) and the discharge surface processing electrode (14) to thereby form a hard coating film (24) on the end surface (4) of the punch (1) and also form a carved portion (14a) with a predetermined depth at the discharge surface processing electrode (14). Next, an X axis driving device (19) and a Y axis driving device (20) are controlled to be driven by the control device (23), and the processing power is supplied between the electrodes of the discharge surface processing electrode (14) and the punch (1) while relatively orbiting the punch (1) and the discharge surface processing electrode (14) within the horizontal plane. Thus, a hard coating film (25) is formed on the side surfaces (5) of the punch (1). Accordingly, even if the punch (1) has a complicated configuration, the discharge surface processing can be performed at each of the cut portions (4a) of the end surface and the cut portions (5a) of the side surfaces of the punch (1).

5 Claims, 6 Drawing Sheets

DISCHARGE SURFACE PROCESSING METHOD

TECHNICAL FIELD

The present invention relates to the improvement of a discharge surface processing method for subjecting the end surface and the side surfaces of material to be processed such as a tool, a mechanical part etc. to the surface processing.

BACKGROUND OF THE INVENTION

Figure 4A:
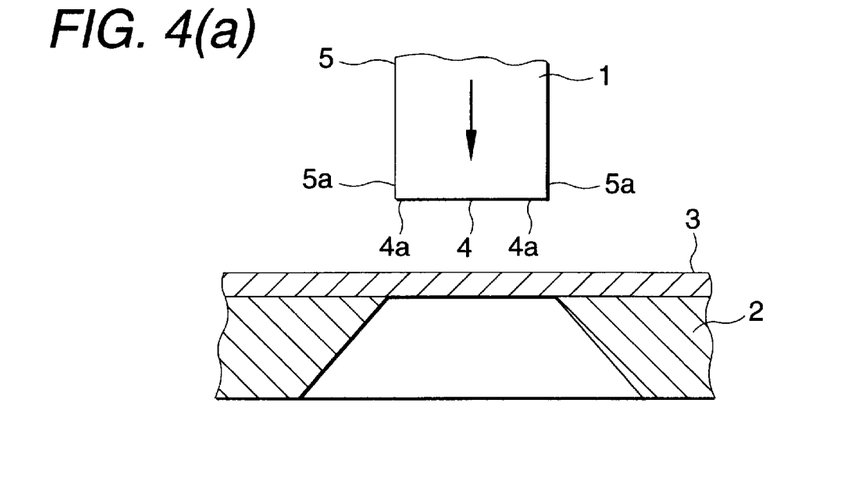
FIGS. 4(a), 4(b) and 4(c) are explanatory diagrams showing an example of the shearing processing.
Figure 4B:
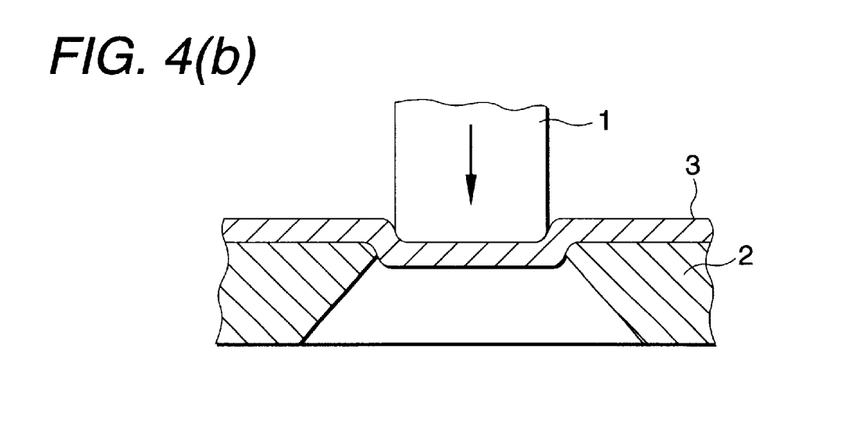
Figure 4C:
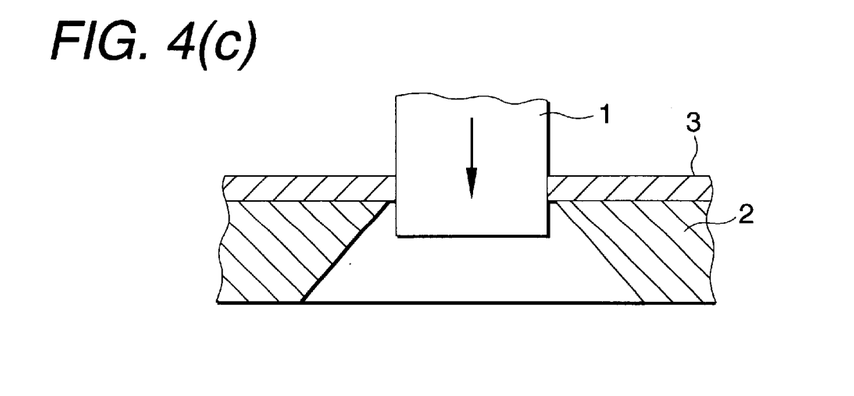

FIGS. 4(a), 4(b) and 4(c) are an example of a shearing processing which is a kind of a plasticity processing. In the figure, a reference numeral 1 depicts a punch, 2 a die, 3 a member to be processed, 4 the end surface of the punch 1, 4a the cut portions of the end surface 4 of the punch 1, 5 the side surfaces of the punch 1, and 5a the cut portions of the side surfaces 5 of the punch 1. As shown in FIGS. 4(a), 4(b) and (c), the shearing processing is performed in a manner that the punch 1 is pushed against the processed member 3 on the die 2 to thereby cut and separate the processed member 3. This processing method is called as a punching processing when the punched member is used as a product, while called as a boring processing when the remaining portion except for the punched portion is used as a product.

Such a shearing processing can process even such a produce with a complicated contour shape in a short time with a single process, so that the shearing processing has been widely employed as the technique for manufacturing various kinds of mechanical parts and secondary processing material. The punch used as a tool for such a plasticity processing is subjected to the surface processing on the end surface and the side surface thereof in order to make the life time thereof longer. In particular, the PVD, the CVD and the discharge surface processing are known as the surface processing methods capable of forming a hard coating film on the processed material. Of these surface processing methods, each of the PVD and the CVD has a problem that the scale thereof is large, the cost of the surface processing is high and it takes a long delivery time. Thus, the discharge surface processing is considered to be suitable for the surface processing of a punch.

Figure 5:
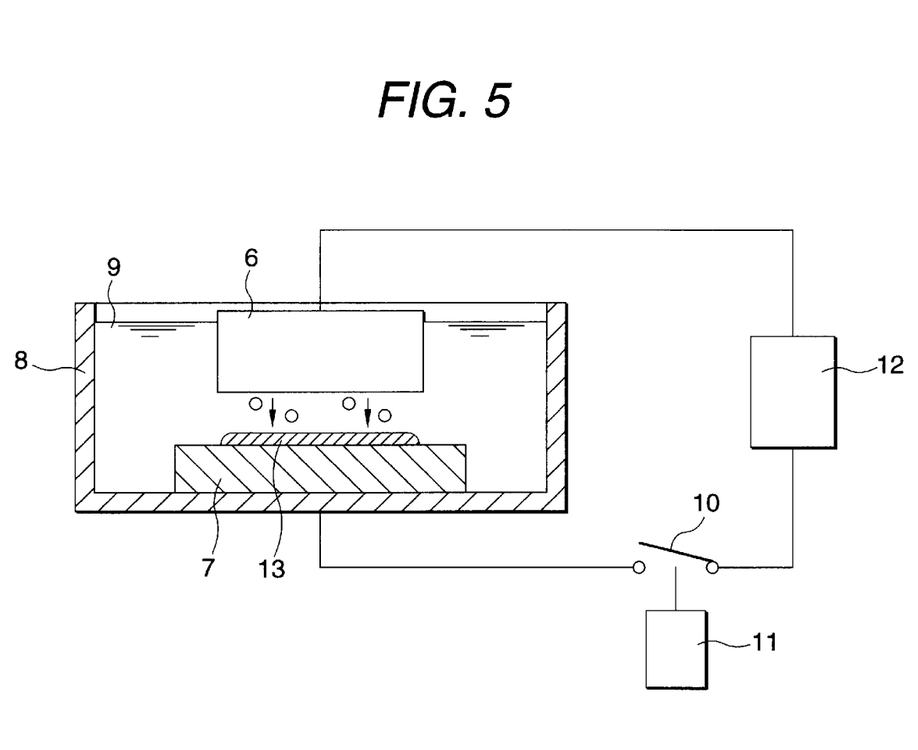
FIG. 5 is an explanatory diagram showing the configuration in the conventional discharge surface processing method.
Figure 6A:
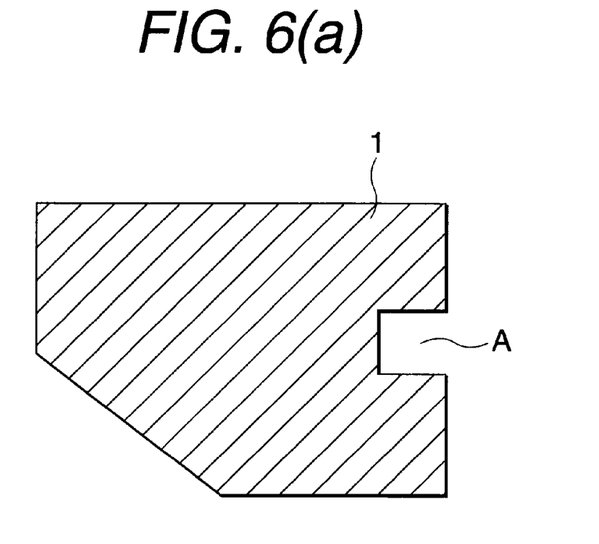
FIGS. 6(a) and 6(b) are sectional views showing an example of a punch with a complicated configuration.
Figure 6B:
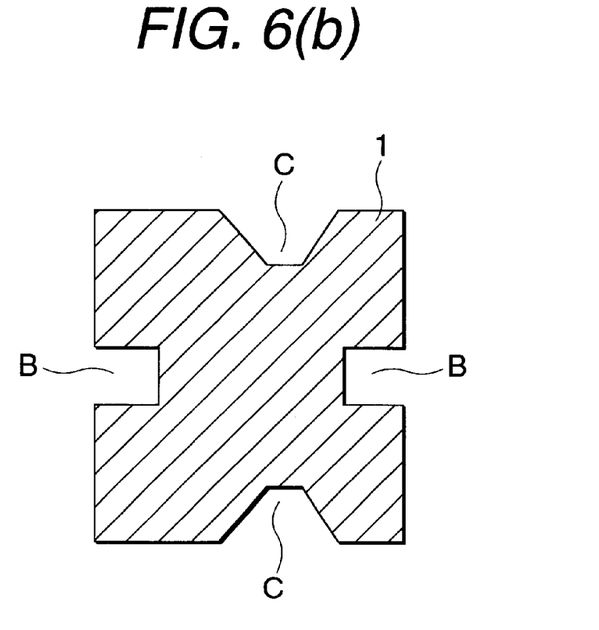

FIG. 5 is an explanatory diagram showing the configuration in the discharge surface processing method disclosed in Japanese Patent Laid-Open No. 192937/1997. In the figure, a reference numeral 6 depicts a powdered electrode serving as a discharge surface processing electrode formed by compressing $TiH_2$, 7 a material to be processed, 8 a processing bath, 9 a processing fluid, 10 a switching element for switching voltage and current applied to the powdered electrode 6 and the processed material 7, 11 a control circuit for controlling the on and off operations of the switching element 10, 12 a processing power source, and 13 a hard coating film formed on the processed material 7. A hard coating film with a large adhesion force can be formed on the surface of steel, sintered hard alloy etc. by using the discharge surface processing apparatus thus configured.

In recent years, precision machinery components such as toothed gears, cams etc. and electronic parts such as IC lead frames have been manufactured by the shearing processing. Thus, the punches with complicated configurations necessary for fabricating such products have been required to be longer in their life times.

Such a punch is required to subject the cut portions of the end surface thereof (4a of FIG. 4) and the cut portions of the side surface thereof (5a of FIG. 4) to the surface processings. However, for example, it is difficult to subject the A portion to the C portions of the side surfaces of the punch having the complicated configuration in the sectional view shown in FIG. 6 to the discharge surface processings. This is caused by such a reason that it is difficult to fabricate the powdered electrode serving as the discharge surface processing electrode with a particular configuration. In view of such a fact, the discharge surface processing can not be performed effectively as to the processed material such as a punch with a complicated configuration which is required to subjected its end surface and side surfaces to the surface processing.

DISCLOSURE OF THE INVENTION

The invention is performed so as to solve the aforesaid problem of the prior art, and an object of the invention is to obtain a discharge surface processing method which can effectively perform the discharge surface processing as to processed material such as a punch with a complicated configuration etc. which is required to subject its end surface and side surfaces to the surface processing.

Another object of the invention is to obtain a discharge surface processing method which can use processed material repeatedly with a simple modification and reduce a maintenance cost thereof.

The discharge surface processing method according to the invention is arranged in a manner that in the discharge surface processing method wherein an X axis driving device, a Y axis driving device and a Z axis driving device are controlled to be driven, material to be processed and a discharge surface processing electrode are moved relatively, and discharge energy is supplied between electrodes of the material to be processed and the discharge surface processing electrode to thereby form a hard coating film on the material to be processed, the discharge surface processing method includes:

a first step of controlling the Z axis driving device to be driven to generate discharge between an end surface of the material to be processed and the discharge surface processing electrode to thereby form, by electric discharge energy, a hard coating film on the end surface of the material to be processed and a carved portion with a predetermined depth at the discharge surface processing electrode; and a second step of, while controlling the X axis driving device and the Y axis driving device to be driven to orbit the material to be processed and the discharge surface processing electrode relatively, generating discharge between a side surface of the material to be processed and a side surface of the carved portion to thereby form, by electric discharge energy, a hard coating film on the side surface of the material to be processed.

Alternatively, in the discharge surface processing method wherein an X axis driving device, a Y axis driving device and a Z axis driving device are controlled to be driven, material to be processed and a discharge surface processing electrode are moved relatively, and discharge energy is supplied between electrodes of the material to be processed and the discharge surface processing electrode to thereby form a hard coating film on the material to be processed, the discharge surface processing method includes:

a step of controlling the X axis driving device, the Y axis driving device and the Z axis driving device to be driven to generate discharge between an end surface of the material to be processed and the discharge surface processing electrode to thereby form, by electric discharge energy, a hard coating film on the end surface of the material to be processed; and, while orbiting the material to be processed and the discharge surface processing electrode relatively, generating discharge between a side surface of the material to be processed and a side surface of the carved portion to thereby form, by electric discharge energy, a hard coating film on the side surface of the material to be processed.

Alternatively, in the discharge surface processing method wherein an X axis driving device, a Y axis driving device and a Z axis driving device are controlled to be driven, material to be processed and a discharge surface processing electrode are moved relatively, and discharge energy is supplied between electrodes of the material to be processed and the discharge surface processing electrode to thereby form a hard coating film on the material to be processed, the discharge surface processing method includes:

a first step of controlling the Z axis driving device to be driven to generate discharge between an end surface of the material to be processed and the discharge surface processing electrode to thereby form, by electric discharge energy, a hard coating film on the end surface of the material to be processed and a carved portion with a predetermined depth at the discharge surface processing electrode;

a second step of, while controlling the X axis driving device and the Y axis driving device to be driven to orbit the material to be processed and the discharge surface processing electrode relatively, generating discharge between a side surface of the material to be processed and a side surface of the carved portion to thereby form, by electric discharge energy, a hard coating film on the side surface of the material to be processed;

a third step of grinding the hard coating film formed on the end surface of the material to be processed; and a fourth step of controlling the Z axis driving device to be driven to generate discharge between the end surface of the material to be processed and a flat surface portion of the discharge surface processing electrode except for the carved portion to thereby form, by electric discharge energy, a hard coating film on the end surface of the material to be processed.

Alternatively, in the discharge surface processing method wherein an X axis driving device, a Y axis driving device and a Z axis driving device are controlled to be driven, material to be processed and a discharge surface processing electrode are moved relatively, and discharge energy is supplied between electrodes of the material to be processed and the discharge surface processing electrode to thereby form a hard coating film on the material to be processed, the discharge surface processing method includes:

a first step of controlling the X axis driving device, the Y axis driving device and the Z axis driving device to be driven to generate discharge between an end surface of the material to be processed and the discharge surface processing electrode to thereby form, by electric discharge energy, a hard coating film on the end surface of the material to be processed; then forming a carved portion with a predetermined depth at the discharge surface processing electrode and, while orbiting the material to be processed and the discharge surface processing electrode relatively, generating discharge between a side surface of the material to be processed and a side surface of the carved portion to thereby form, by electric discharge energy, a hard coating film on the side surface of the material to be processed;

a second step of grinding the hard coating film formed on the end surface of the material to be processed; and a third step of controlling the Z axis driving device to be driven to generate discharge between the end surface of the material to be processed and a portion different from the carved portion of the discharge surface processing electrode to thereby form, by electric discharge energy, a hard coating film on the end surface of the material to be processed.

Alternatively, in the discharge surface processing method wherein an X axis driving device, a Y axis driving device and a Z axis driving device are controlled to be driven, material to be processed and a discharge surface processing electrode are moved relatively, and discharge energy is supplied between electrodes of the material to be processed and the discharge surface processing electrode to thereby form a hard coating film on the material to be processed, the discharge surface processing method includes:

a step of grinding the hard coating film formed on the end surface of the material to be processed when the material to be processed is worn out; and a step of controlling the Z axis driving device to be driven to generate discharge between the end surface of the material to be processed and the discharge surface processing electrode to thereby form, by electric discharge energy, a hard coating film on the end surface of the material to be processed.

Since the invention is configured in the aforesaid manner, the following technical advantages can be obtained.

The discharge surface processing method according to the invention can effectively perform the discharge surface processing also as to the material to be processed such as a punch with a complicated configuration etc. which is required to subject the end surface and the side surfaces thereof to the surface processing.

Further, the discharge surface processing method according to the invention can form a hard coating film with a higher accuracy.

Furthermore, the discharge surface processing method according to the invention can use the material to be processed repeatedly by performing a simple modification, so that the maintenance cost thereof can be reduced.

BEST MODE FOR CARRYING OUT THE INVENTION

First Embodiment

Figure 1:
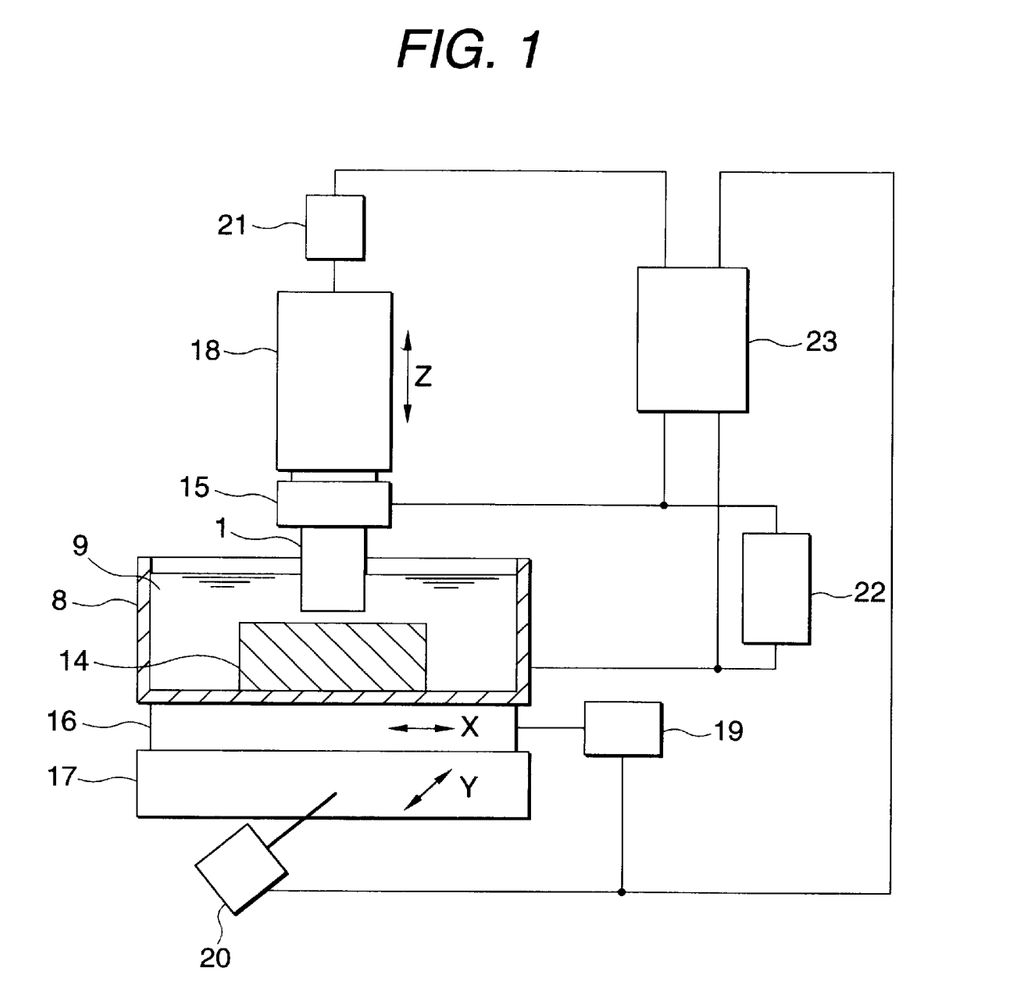
FIG. 1 is a constitutional diagram showing the discharge surface processing method according to the first embodiment of the invention.

FIG. 1 is a constitutional diagram showing the discharge surface processing method according to the first embodiment of the invention. In the figure, a reference numeral 1 depicts a punch which is shown as an example of the processed material which is required to subject its end surface and side surfaces to the surface processing. A reference numeral 8 depicts a processing bath, 9 a processing fluid, 14 a discharge surface processing electrode, 15 a chucking device for supporting the pinch 1, 16 an X table, 17 a Y table, 18 a main shaft coupled to the chucking device 15, 19 an X axis driving device for driving the X table 16, 20 a Y axis driving device for driving the Y table 17, 21 a Z axis driving device for driving the main shaft 18, 22 a processing power source device formed by a processing power source and a switching element etc., and 23 a control device. The discharge surface processing electrode 14 is fixed to the processing bath 8 on the X table 16. The relative movement between the punch 1 and the discharge surface processing electrode 14 is attained by controlling the driving operations of the X axis driving device 19, the Y axis driving device 20 and the Z axis driving device 21 in accordance with the instruction from the control device 23. The discharge surface processing electrode 14 is formed by the material forming a predetermined hard coating film. A hard coating film formed by the material of the discharge surface processing electrode 14 or the composition of the material of the discharge surface processing electrode 14 and the component of the processing fluid 9 can be formed on the surface of the punch 1 by supplying the processing power from the processing power source device 22 while controlling the electrode distance between the discharge surface processing electrode 14 and the punch 1.

Figure 2A:
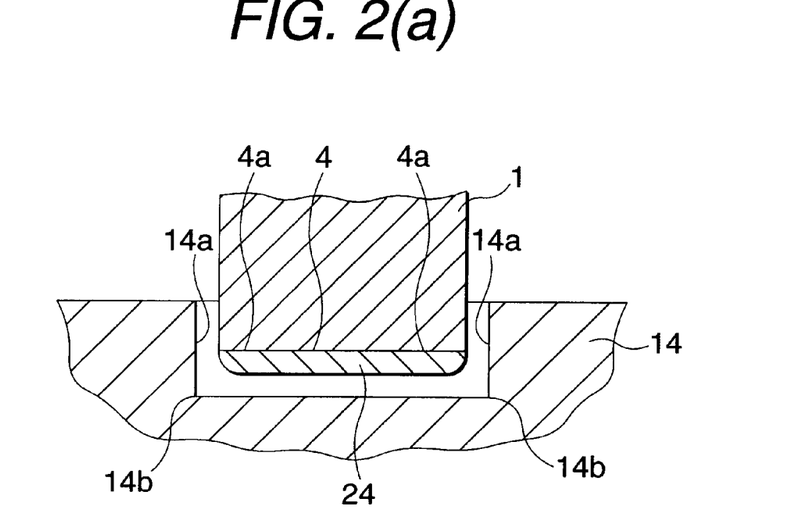
FIGS. 2(a) and 2(b) are explanatory diagrams showing the discharge surface processing method according to the first embodiment of the invention.
Figure 2B:
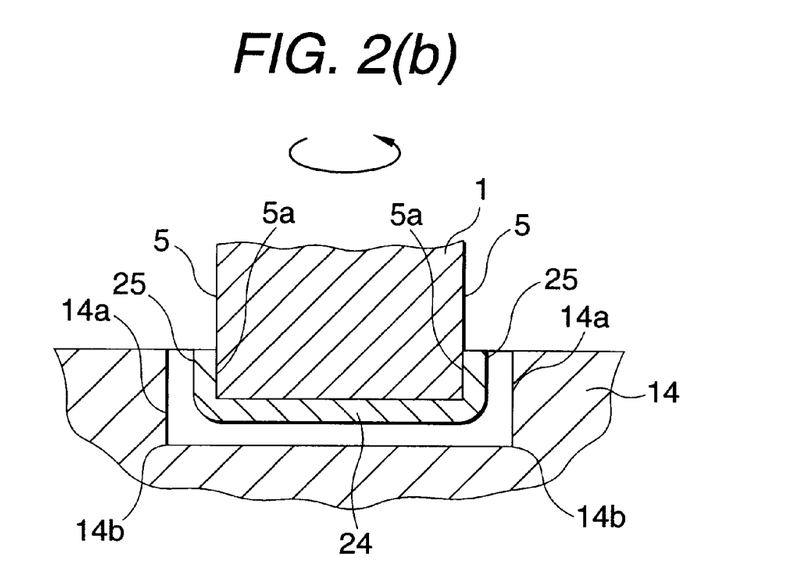
Figure 3A:
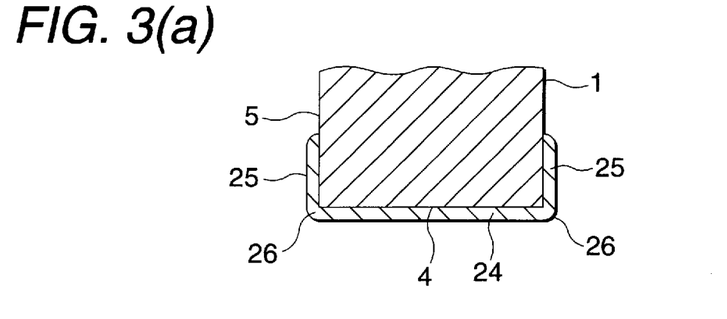
FIGS. 3(a), 3(b), 3(c) and 3(d) are explanatory diagrams showing the discharge surface processing method according to the second embodiment of the invention.
Figure 3B:
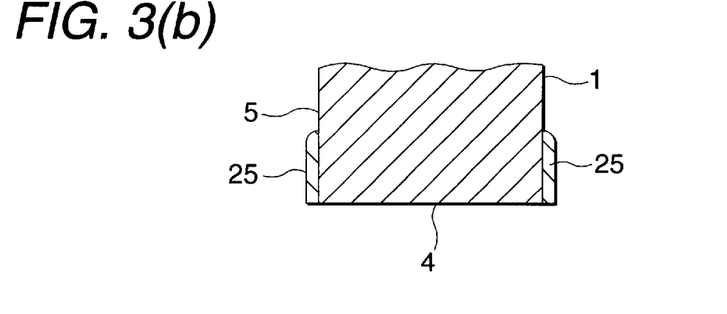
Figure 3C:
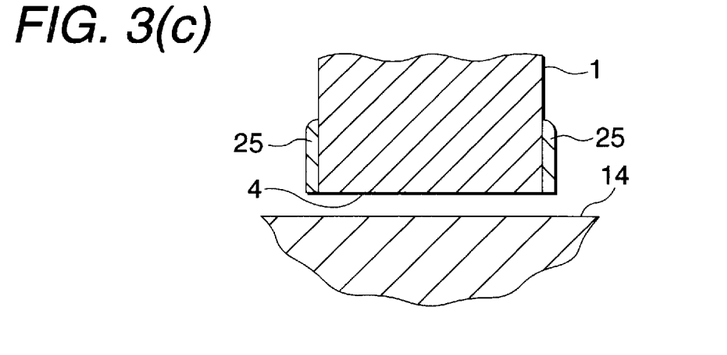
Figure 3D:
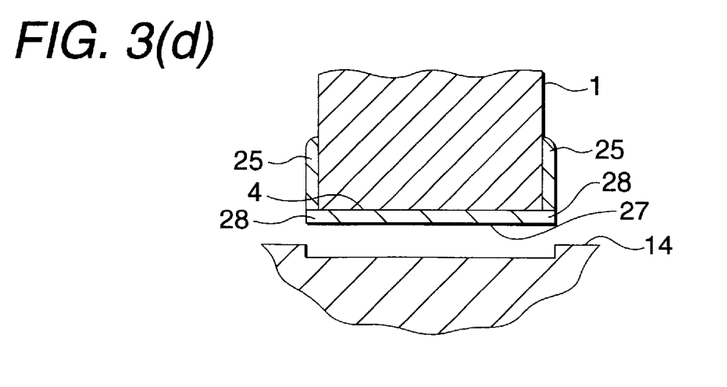

Then, the operation will be explained. First, the Z axis driving device 21 is controlled to be driven by the control device 23, and the processing power is supplied between the electrodes of the discharge surface processing electrode 14 and the punch 1 from the processing power source device 22. Thus, as shown in FIG. 2(*a*), electric discharge is generated between the end surface 4 of the punch 1 and the discharge surface processing electrode 14 to thereby form a hard coating film 24 on the end surface 4 of the punch 1 and also form a carved portion 14*a* with a predetermined depth at the discharge surface processing electrode 14. The depth of the carved portion 14*a* is set about several mm, for example. Next, the X axis driving device 19 and the Y axis driving device 20 are controlled to be driven by the control device 23, and the processing power is supplied between the electrodes of the discharge surface processing electrode 14 and the punch 1 from the processing power source device 22 while relatively orbiting the punch 1 and the discharge surface processing electrode 14 within the horizontal plane. Thus, as shown in FIG. 2(*b*), hard coating films 25 are formed on the side surfaces 5 of the punch 1.

In this manner, even if the punch 1, which is shown as an example of the processed material required to subject its end surface and side surfaces to the surface processing, has a complicated configuration, the discharge surface processing can be performed at each of the cut portions 4*a* of the end surface and the cut portions 5*a* of the side surfaces of the punch 1.

Although in the aforesaid description, the explanation has been made as to the case where, after carving the discharge surface processing electrode 14 to the predetermined depth, the hard coating films 25 are formed on the side surfaces 5 of the punch 1 while relatively orbiting the punch 1 and the discharge surface processing electrode 14 within the horizontal plane, the hard coating films 25 may be formed on the side surfaces 5 of the punch 1 while carving the discharge surface processing electrode 14 to the predetermined depth and relatively orbiting the punch 1 and the discharge surface processing electrode 14.

Second Embodiment

The discharge surface processing method according to the second embodiment of the invention will be explained. In the first embodiment, the carved portion 14*a* is formed at the discharge surface processing electrode 14 and the discharge surface processing is performed on the side surfaces 5 of the punch 1. However, in this case, the electric discharge likely occurs concentrically at the corner portions 14*b* of the carved portion 14*a* in FIGS. 2(*a*) and 2(*b*), so that the corner portions 26 of the punch 1 likely become round as shown in FIG. 3(*a*). Thus, when a product is required to have a higher accuracy, this punch 1 can be not used as it is. In such a case, after grinding the hard coating film 24 formed on the end surface of the punch 1 as shown in FIG. 3(*b*), the end surface 4 of the punch 1 is subjected to the discharge surface processing at the flat surface portion of the discharge surface processing electrode 14 except for the carved portion 14*a* as shown in FIG. 3(*c*), and a hard coating film 27 is formed on the end surface as shown in FIG. 3(*d*), whereby sharp corner portions 28 can be formed. Accordingly, a product with a higher accuracy can be fabricated in the plasticity processing using the punch 1 fabricated in this manner.

Although, in FIG. 3(*d*), the discharge surface processing electrode 14 is worn out to form a concave portion at the discharge surface processing electrode 14, this concave portion is shown in an enlarged scale for convenience of explanation. In fact, the depth of this concave portion is in a range of about several $\mu$m to several ten $\mu$m. Thus, the electric discharge does not occur concentrically unlike the portion between the corner portions 14*b* of the carved portion 14*a* (with a depth of about several mm) of FIGS. 2(*a*) and 2(*b*) and the punch 1, so that the sharp corner portions 28 can be formed as described above.

Third Embodiment

As shown in the first and the second embodiments, since the side surfaces 5 of the punch 1 are subjected to the discharge surface processing with a predetermined width of about several mm, for example, when the corner portions 26 or 28 are worn out due to the usage, the punch 1 can be used again by grinding the hard coating film 24 or 27 formed on the end surface of the punch 1 as shown in FIG. 3(*b*) (for example, about 0.2 mm to 0.3 mm) and subjecting the end surface 4 to the discharge surface processing by the discharge surface processing electrode 14 as shown in FIGS. 3(*c*) and (*d*) Since the punch 1 can be used repeatedly by performing such a simple modification, the maintenance cost thereof can be reduced.

INDUSTRIAL APPLICABILITY

As described above, the discharge surface processing according to the invention is suitable for use in the surface processing subjected to the end surface or the side surfaces of a processed material in order to improve the durability.

What is claimed is:

1. In a discharge surface processing method wherein an X axis driving device, a Y axis driving device and a Z axis driving device are controlled to be driven, material to be processed and a discharge surface processing electrode are moved relatively, and discharge energy is supplied between said material to be processed and said discharge surface processing electrode to thereby form a hard coating film on said material to be processed, said discharge surface processing method comprising:

a first step of controlling said Z axis driving device to be driven to generate discharge between an end surface of said material to be processed and said discharge surface processing electrode to thereby form, by electric discharge energy, a hard coating film on said end surface of said material to be processed and a carved portion with a predetermined depth at said discharge surface processing electrode; and a second step of, while controlling said X axis driving device and said Y axis driving device to be driven to orbit said material to be processed and said discharge surface processing electrode relatively, generating discharge between a side surface of said material to be processed and a side surface of said carved portion to thereby form, by electric discharge energy, a hard coating film on said side surface of said material to be processed.

2. In a discharge surface processing method wherein an X axis driving device, a Y axis driving device and a Z axis driving device are controlled to be driven, material to be processed and a discharge surface processing electrode are moved relatively, and discharge energy is supplied between said material to be processed and said discharge surface processing electrode to thereby form a hard coating film on said material to be processed, said discharge surface processing method comprising:

a step of controlling said X axis driving device, said Y axis driving device and said Z axis driving device to be driven to generate discharge between an end surface of said material to be processed and said discharge surface processing electrode to thereby form, by electric discharge energy, a hard coating film on said end surface of said material to be processed; and, while orbiting said material to be processed and said discharge surface processing electrode relatively, generating discharge between a side surface of said material to be processed and a side surface of a carved portion to thereby form, by electric discharge energy, a hard coating film on said side surface of said material to be processed.

3. In a discharge surface processing method wherein an X axis driving device, a Y axis driving device and a Z axis driving device are controlled to be driven, material to be processed and a discharge surface processing electrode are moved relatively, and discharge energy is supplied between said material to be processed and said discharge surface processing electrode to thereby form a hard coating film on said material to be processed, said discharge surface processing method comprising:

a first step of controlling said Z axis driving device to be driven to generate discharge between an end surface of said material to be processed and said discharge surface processing electrode to thereby form, by electric discharge energy, a hard coating film on said end surface of said material to be processed and a carved portion with a predetermined depth at said discharge surface processing electrode;

a second step of, while controlling said X axis driving device and said Y axis driving device to be driven to orbit said material to be processed and said discharge surface processing electrode relatively, generating discharge between a side surface of said material to be processed and a side surface of said carved portion to thereby form, by electric discharge energy, a hard coating film on said side surface of said material to be processed;

a third step of grinding said hard coating film formed on said end surface of said material to be processed; and a fourth step of controlling said Z axis driving device to be driven to generate discharge between said end surface of said material to be processed and a flat surface portion of said discharge surface processing electrode except for said carved portion to thereby form, by electric discharge energy, a hard coating film on said end surface of said material to be processed.

4. In a discharge surface processing method wherein an X axis driving device, a Y axis driving device and a Z axis driving device are controlled to be driven, material to be processed and a discharge surface processing electrode are moved relatively, and discharge energy is supplied between said material to be processed and said discharge surface processing electrode to thereby form a hard coating film on said material to be processed, said discharge surface processing method comprising:

a first step of controlling said X axis driving device, said Y axis driving device and said Z axis driving device to be driven to generate discharge between an end surface of said material to be processed and said discharge surface processing electrode to thereby form, by electric discharge energy, a hard coating film on said end surface of said material to be processed; then forming a carved portion with a predetermined depth at said discharge surface processing electrode and, while orbiting said material to be processed and said discharge surface processing electrode relatively, generating discharge between a side surface of said material to be processed and a side surface of said carved portion to thereby form, by electric discharge energy, a hard coating film on said side surface of said material to be processed;

a second step of grinding said hard coating film formed on said end surface of said material to be processed; and a third step of controlling said Z axis driving device to be driven to generate discharge between said end surface of said material to be processed and a portion different from said carved portion of said discharge surface processing electrode to thereby form, by electric discharge energy, a hard coating film on said end surface of said material to be processed.

5. A discharge surface processing method according to one of claims 1 to 4, said discharge surface processing method further comprising:

a step of grinding said hard coating film formed on said end surface of said material to be processed when said material to be processed is worn out; and a step of controlling said Z axis driving device to be driven to generate discharge between said end surface of said material to be processed and said discharge surface processing electrode to thereby form, by electric discharge energy, a hard coating film on said end surface of said material to be processed.

* * * * *